United States Patent [19]

Anderson et al.

[11] Patent Number: 4,653,958

[45] Date of Patent: Mar. 31, 1987

[54] MODULAR SECONDARY CONTAINMENT KIT FOR HOUSING PIPELINES

[76] Inventors: Andrew A. Anderson, 386 Linkhorne Ct., San Jose, Calif. 95133; Garey L. Kirkland, 88 Gladys Ave., Mountain View, Calif. 94043

[21] Appl. No.: 722,273

[22] Filed: Apr. 11, 1985

Related U.S. Application Data

[63] Continuation-in-part of Ser. No. 683,919, Dec. 19, 1984, abandoned.

[51] Int. Cl.[4] .......................... F16L 1/00; F16L 55/00; G01M 3/08

[52] U.S. Cl. ................................ 405/157; 73/40.5 R; 138/104; 138/105

[58] Field of Search ........ 405/154, 157, 179, 119-122, 405/37, 54; 137/312; 138/103-106, 108, 111; 73/40.5 R, 49.1, 49.2

[56] References Cited

U.S. PATENT DOCUMENTS

| | | | |
|---|---|---|---|
| 1,561,094 | 11/1925 | Malone . | |
| 2,639,680 | 5/1953 | Tennison | 405/122 |
| 2,862,367 | 12/1958 | Silverstein et al. | 405/157 |
| 3,152,572 | 10/1964 | Allhoff . | |
| 3,261,201 | 7/1966 | Pottash | 73/40.5 R |
| 3,276,247 | 10/1966 | Bunn | 73/40.5 R |
| 3,515,173 | 6/1970 | Regal . | |
| 3,531,264 | 9/1970 | Greipel . | |
| 3,611,731 | 10/1971 | Edmondson | 405/122 X |
| 3,721,270 | 3/1973 | Wittgenstein | 138/104 |
| 3,910,102 | 10/1975 | McLean | 73/40.5 R |
| 4,404,988 | 9/1983 | Trammell | 137/312 X |

FOREIGN PATENT DOCUMENTS

| | | | |
|---|---|---|---|
| 2052592 | 5/1972 | Fed. Rep. of Germany . | |
| 2715365 | 10/1978 | Fed. Rep. of Germany | 405/157 |
| 2423587 | 12/1979 | France | 405/154 |

*Primary Examiner*—Richard J. Scanlan, Jr.
*Assistant Examiner*—Nancy J. Stodola
*Attorney, Agent, or Firm*—Thomas Schneck

[57] ABSTRACT

A kit for forming a secondary confinement installation for protecting earth from contamination due to leakage and spills from pipelines in small installations, such as service stations. The kit includes long trough sections and short connector sections with joints therebetween which maintain a level floor. The connector sections may have various shapes, such as right angle sections, half-right angle sections, T-sections, as well as a few special purpose sections. The special purpose sections include a sump section located at the low point of the installation, a dispenser unit section intended to provide catch basis for fluid dispensers and box sections which protect pipe egress zones at storage tanks. At installation time, the sections are supported by a bed of aggregate material, the pipe lines positioned and the trough sections and connector sections are filled with aggregate material and then cover members are set atop the sections, the cover sections having a vapor barrier member over the edge where the cover member and upper sidewalls of the trough and connector sections meet. Any fluid leaking from the pipelines flows toward a sump section where a check tube is provided for monitoring leaks.

14 Claims, 12 Drawing Figures

MODULAR SECONDARY CONTAINMENT KIT FOR HOUSING PIPELINES

DESCRIPTION

1. Cross Reference to Related Application

This is a continuation-in-part of application Ser. No. 683,919 filed Dec. 19, 1984, now abandoned.

2. Technical Field

The invention relates to confinement of environmentally hazardous fluids and in particular to a kit for achieving such confinement.

3. Background Art

Various structures for housing pipelines which carry environmentally hazardous fluids are known. For example, Offenlegungsschrift No. 2052592 shows a pipeline which is received within a plastic aggregate-filled trough to protect against pipeline leaks. The trough may be buried in a ditch and the structure may include an electrical leak detector.

U.S. Pat. No. 3,721,270 shows a pipeline protector which includes a jacket to catch leaks. A liquid presence detector signals liquid accumulation outside of the pipeline.

U.S. Pat. No. 3,152,572 shows a trough-like pan disposed beneath a fluid line carried above a ceiling. The pan is part of an indicator structure visible through the ceiling from below. The pan catches leaks from the line and an indicator surface, visible from below, indicates the presence of leaks.

U.S. Pat. No. 1,561,094 discloses an above-ground fuel conduit system wherein pipes are surrounded by a safety jacket to catch leaks.

In U.S. Pat. No. 3,531,264 an open channel hood overlies a fluid carrying, buried conduit and captures any fluid escaping from a leak. The fluid is channeled to a riser carrying a pressure activated signal.

U.S. Pat. No. 3,515,173 discloses a shield having a hood overlying a gas main. Riser vents connected to the hood produce sound as leaking gas escapes through the vent.

Previously, most of the devices of the prior art were applicable to pipeines and mains, but were usually not used in small installations, such as gasoline service stations. Recently, because of concern for ground water contamination, there has been a recognized need for some means for protecting a small installation. Theoretically, the structures of the prior art might be applicable, except for the considerable installation expense and difficulty.

An object of the invention was to provide a pipeline containment apparatus for small installations, such as service stations, factories and the like which is easy to install, can be retrofitted into existing facilities, and provides a means for determining leakage.

DISCLOSURE OF THE INVENTION

The above object has been achieved with a modular pipeline containment kit which features relatively long trough sections and relatively short connector sections so that a kit comprising connector sections and trough sections may be used to provide secondary containment for pipelines in small installations, such as service stations and the like. The trough sections comprise linear sections. The connector sections comprise right angle sections, half-right angle sections, T sections, box sections, dispenser sections and a sump section, all having the same internal cross-sectional dimensions as the linear sections, except where joints are formed. These connector sections are made in various prefabricated short lengths compared to the relatively long trough sections. A joint between a connector and a trough section may be a gripping joint, such as a tongue-and-groove joint, or a lapping joint secured with adhesives, for preventing fluid escape. Trough sections are placed in a ditch surrounding pipelines on three sides at all locations extending from a source to various dispensing units and are joined by connector sections. Even at the source and the dispensing units, modular sections provide protection. The kit sections are installed so that there is a downward slope toward a sump. The sump section has a drain hole and an upright check tube connected to the drain hole by means of a sloping pipe. Any fluid which leaks from pipes will run into the trough sections and there flow towards the sump section, thence to the drain and ultimately to the check tube where a sensing probe may be inserted.

The trough and connector sections are supported in a ditch by surrounding aggregate. A cover member may be placed over the various sections and then a vapor barrier placed over the cover member. A concrete cap is placed over the cover and vapor barrier combination and then a paving cap is placed over the concrete cap so that the pipeline location is not apparent at surface level.

The longest trough sections, linear pieces, are usually not longer than approximately 20 feet. Trough sections, as well as connector sections, are small enough to be handled by one man and provide for an installation which is reliable, easy to complete and economical.

BEST MODE FOR CARRYING OUT THE INVENTION

Figure 1:
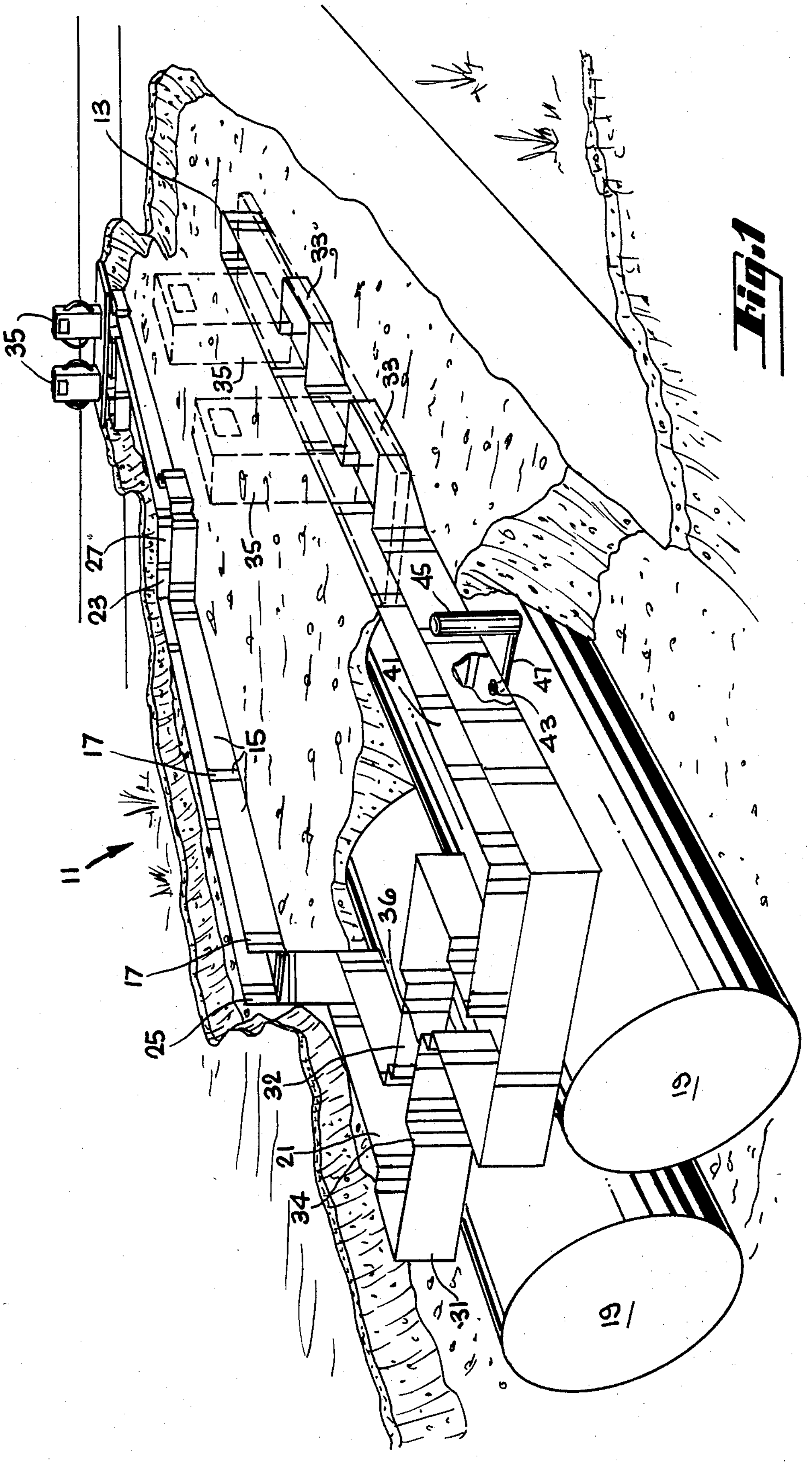
FIG. 1 is a perspective view of a modular pipeline containment kit installation in accord with the present invention.

With reference to FIG. 1, a secondary containment installation 11 may be seen to be buried in trenches, below ground, at a service station. While the present invention is described with reference to a small service station, there is no restriction of the invention to such an application. Moreover, there is no restriction that the containment system be used underground, although an object of the invention is to protect soil from contamination and so most frequently, the invention will be used in the earth or immediately upon it. A ditch 13 is seen to be an excavation through a top layer of pavement and then through underlying soil to a depth of approximately 30 inches more or less. The present invention contemplates installation of modular sections 15 in a ditch which slopes toward a low point where a sump, discussed below, is installed. The linear sections 16 are connected at connector section 17 which form joints between adjacent sections. The combination of troughs and connectors makes possible a highly modular construction which is adaptable to almost any small facility such as a service station, where short and irregular runs of pipelines are present. The trough sections and connector sections are made of a material which is impervious to the substance which might leak from pipelines carried within the troughs. For example, in the case of a service station, the trough sections are made of a petroleum resistant resin epoxy which is formed in molds or may be cast. The prefabricated pieces being made of polymeric material are sufficiently light to be assembled by one man at a job site.

In FIG. 1, pipelines run from storage tanks 19 to product dispenser units 35 with one pipeline associated with each storage tank. Typically, a service station will have more than one dispenser unit per island and so it is common to have two or three parallel pipes coming from an equal number of storage tanks. The pipelines are disposed in the trough sections and connector sections previously described. To make a run from the storage tanks to the dispenser units, different types of connector sections are employed between linear trough sections 21. These connector sections include right angle sections 23, half-right angle sections 25 and T sections 27. From these connector sections, together with special purpose nipple sections, sometimes interconnecting adjacent connector sections, and together with linear trough sections, a protective installation can be formed. The sections have no critical dimensions but typical dimensions are a wall thickness of 3/16 inch, a width of about 30 inches and side walls about 20 inches high. Linear sections are preferably 16 feet long with shorter linear pieces cut from longer pieces with a portable electric hand saw. Joined sections should have a uniform cross-section for pipeline runs, except where pipes bend or turn. At those locations, a widened cross-section may be needed. Joints should be sealed with a sealant which will be chemically resistant to attack by fluid carried in the pipes.

Several special purpose connector sections are employed. Box sections 31 are adapted to fit over the turbine units on tanks 19. These turbine units are pumps which maintain pressure within the pipelines. Box section 31 is sealed to tank 19 in the area immediately surrounding the turbine unit and the pipes emerging from the tanks. These pipes make a turn in the direction of the dispenser units and an opening in the box section is provided in the direction of the turn. Also, box sections from adjacent tanks are interconnected by means of a linear section 32 so that a product line from each tank can be carried in each trough run. The linear section 32 is connected to adjacent box section 31. Short nipple sections 34 and 36 may be needed to join irregular pieces.

Another irregularly shaped connector section is the dispenser profile section 33 beneath dispenser units 35. These sections surround pipelines as they enter dispenser units from below, providing a catch basin below the dispenser units and the internal pipes of a dispenser unit. Thus, if a dispenser unit itself leaks, the dispenser profile sections will catch such leakage. The special sections have sidewalls and a bottom wall with a slight slope emptying into the main trough section. The main trough sections, in turn, have a slight slope toward the low point of the excavation where a sump is located.

At the low point, a sump connector section 41 is specially provided. As mentioned above, all sections slope downwardly toward the sump section. A drain hole 42 is provided in the bottom wall of the sump section which will feed into an upright check tube 45 located nearby and connected to the drain hole by means of a downwardly sloping drain pipe 47. The purpose of the check tube is to allow leakage to be sensed, by means of a probe, such as a cotton swab or by means of an electronic instrument. The check tube 45 also allows visual inspection, with a flashlight, and to facilitate observation, the bottom of the check tube may be painted with a coating which is visible in the absence of fluid of the kind carried in the pipes.

Figure 2:
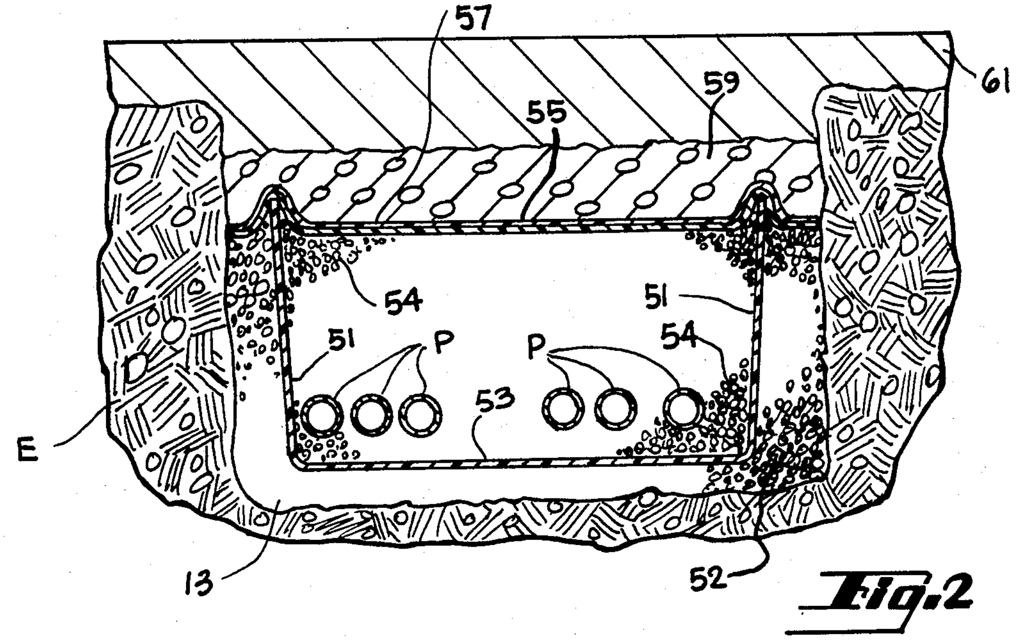
FIG. 2 is a cross sectional view of a trough section carrying pipelines buried within a ditch and capped.

In FIG. 2, a cutaway section of the earth, E, shows a cross section of a trough section with sidewalls 51 supported by aggregate material 52 between the earth and the sidewalls. Also, bottom wall 53 is similarly supported by a thin layer of aggregate material between the earth and the bottom wall. The trough section is seen to house a plurality of pipes, P, forming individual pipelines. The pipes are supported by aggregate material 54, similar to aggregate material 52. Such aggregate material fills the region between sidewalls and a cover member 55 is placed over the top of the sidewalls so that the entire trough is now a closed, filled container.

Over the top of cover member 55 a vapor barrier 57 is placed which is a thin plastic sheet. This sheet is brought over the top of the cover and is allowed to partially drape down the sidewalls to prevent moisture from penetrating the rim of the upright walls where the cover is seated. The cover member 55 may be secured and sealed to the sidewalls, with a caulking compound, but small holes will develop which may permit entry of moisture. Since this moisture will eventually migrate to the bottom of the trough and then run toward the sump, such moisture might be confused with leakage from the pipelines. For this reason, it is important to place the vapor barrier over the cover member in a way which will discourage vapor entry into the trough. While the vapor barrier 57 has been shown to be a plastic sheet over cover member 55, the vapor member may be considered to be part of the cover member and may be incorporated into the physical structure of the cover.

A concrete cap 59 is poured over the cover to seal the various trough sections and cover members in place and then a paving cap 61 is used to supplement the concrete cap, bringing the installation to surface level. Both the concrete cap and paving cap may be considered to be a single cap since sometimes only concrete is used and two separate cap members are not essential. The cover member 55 may have different lengths than the trough sections and there is no edge-to-edge seal between cover members. Joints and special purpose sections are also covered by cover members, frequently by the same pieces covering linear sections. However, caulking material may be applied between abutting edges to prevent moisture entry.

Figure 3:
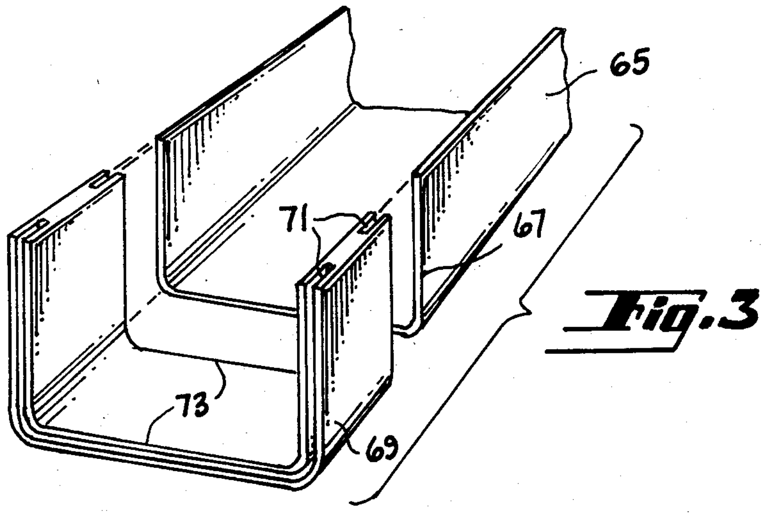
FIG. 3 is an exploded perspective view of a trough section and an auxiliary nipple section forming a joint.

In FIG. 3, a linear trough section 65 is seen having a forward U-shaped edge 67 which is slightly rounded to form the male member of a joint. Connector section 69, a nipple section, has opposite U-shaped edges 69. Since this section is thicker in cross sectional dimension than the linear section 65 there is room for a U-shaped groove 71 forming the female member of a joint for receiving edge 67. Groove 71 and edge 67 have a gripping relationship, which may be a tongue-and-groove or interlocking construction, or a mating construction with a trough edge as a male joint member and a connector section groove as a female joint member. The two members are adhesively fastened together by epoxy, preferably an epoxy similar in composition to the epoxy from which the trough sections are molded. The length dimension 73 of nipple sections is usually relatively short, perhaps six or eight inches long and about one inch thick at each wall. These sections are rigid, yet have grooves which must be deep enough and thick enough to resist breakage and tough enough to allow pounding with light tools when sections are assembled. On the other hand, linear sections are more flexible because they are not as thick. Some degree of flexing in the linear sections as well as in connector sections is useful during the assembly process.

Figure 4:
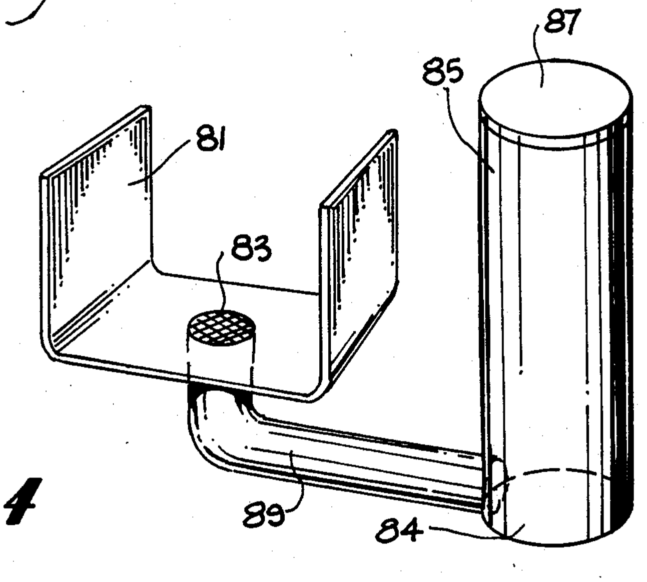
FIG. 4 is a perspective view of a sump section.

FIG. 4 shows a sump connector section 81 having a drain hole 82. Sump section 81 is usually somewhat longer than a joint, but not significantly longer. This section has a drain hole 83 in which fluid arriving through the trough sections will be drained into a sloping drain pipe 89 and thence to the upright check tube 85. The check tube has a cover 87, usually at surface level and a bottom wall 84 on which collected fluid will rest. In operation, cover 86 is removed and a probe is placed in the upright check tube 85 and lowered to bottom wall 84 where any fluid escaping from the pipe lines may be detected. Sump-section 81 is connected to other trough sections by means of connector sections of the type illustrated in FIG. 3. The same connector sections join other special purpose sections such as dispenser profile sections and box sections.

Figure 5:
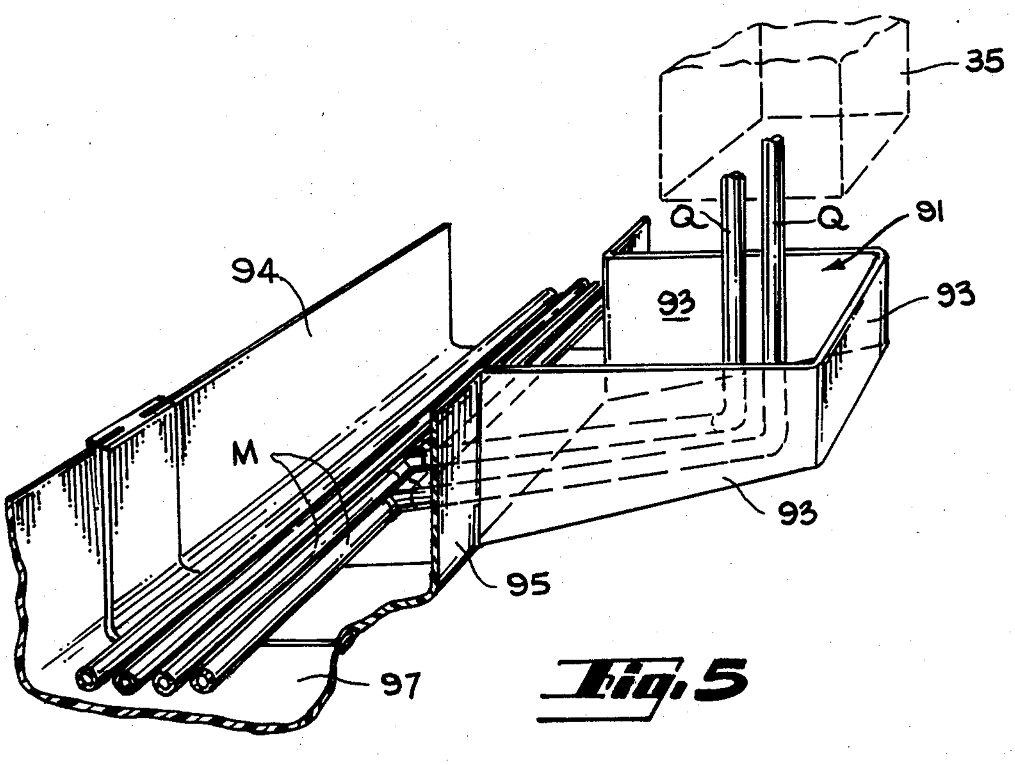
FIG. 5 is a perspective view of a dispenser profile connector section connected by means of a nipple section to a linear section.

FIG. 5 illustrates a dispenser profile connector section 91 which has three sidewalls 93 which surround three sides of dispenser unit 35. The purpose of the dispenser profile section is to provide a catch basin for pipelines Q which make a turn from the main pipeline run, M. Also, the dispenser profile section is large enough to provide a catch basin for pipes within the dispenser unit and sometimes even from a surrounding island if not too large in size. The sidewalls terminate by flaring at right angles toward the main pipeline direction so that flared edges may be connected by means of nipple section 95 and then joined to joined to linear section 97. The far wall 94, which is part of the dispenser profile section, remains parallel to a corresponding wall of linear section 97.

Figure 6:
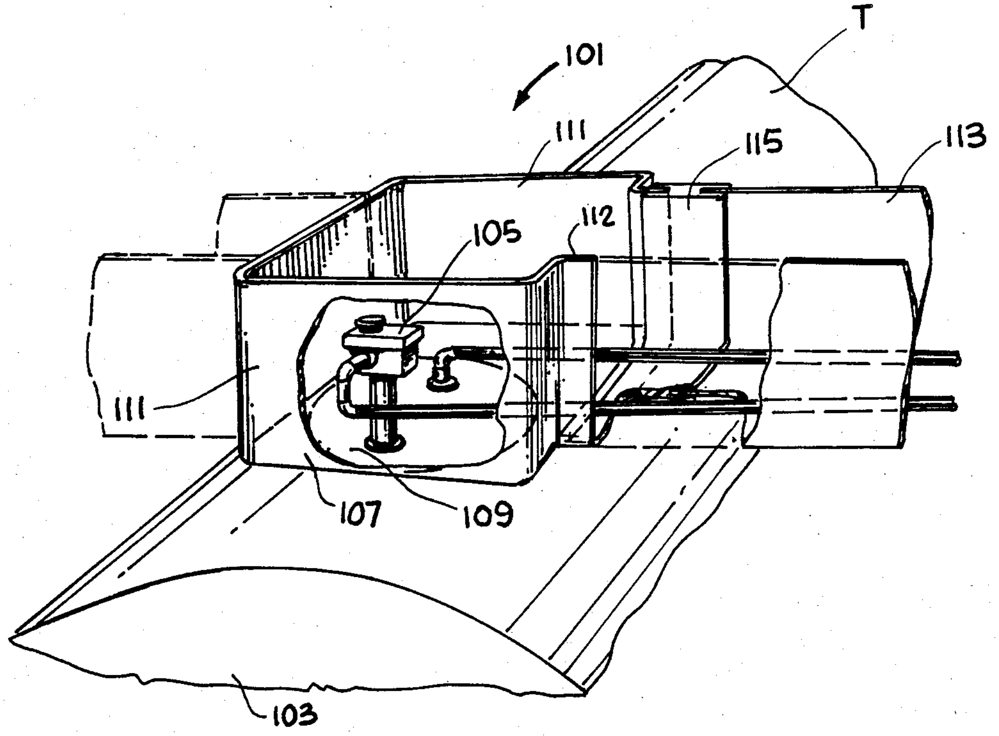
FIG. 6 is a perspective view of a box section mounted on a tank connected to a linear section by means of a nipple section.

With reference to FIG. 6, a box connector section 101 may be seen to be mounted on tank 103. Box section 101 surrounds turbine 105 and the pipes emerging from the turbine. The box section features a bottom wall 107 having a hole 109 defined therein having a shape so that the box section may be sealed to the top of the tank with a caulking material. Sidewalls 111 enclose pipes emerging from the tank as then turn in the direction of the main pipeline rim. While the sidewalls may be spaced further apart than the walls of a linear section, the sidewalls flare inwardly at regions 112 so that the box section 105 may be joined to linear section 113 by means of nipple section 115. In this manner, any leakage in the vicinity of the turbine 105 will be funneled into linear section 113 where the fluid will migrate toward the sump and be collected.

Figure 7:
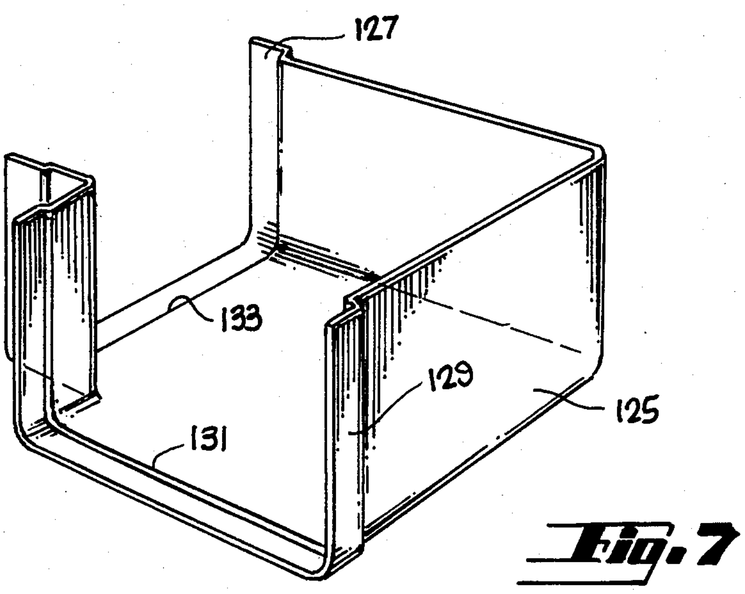
FIG. 7 is a perspective view of a right angle bend connector section connecting linear sections.

With reference to FIG. 7, the right angle box section 125 has a different type of joint for connection to adjoining linear sections than the joint illustrated in FIG. 3. In previous figures, the joint was formed by special nipple sections such as a tongue and groove connector section. However, such nipple sections are more expensive to manufacture and some materials may break at the grooves when sections are joined together. In FIG. 7, no nipple sections are used. Rather, ends of short sections are provided with outwardly extending lips 127 and 129. The outward, wall-to-wall extent of each lip is such that a linear section may be brought into abutment with an inward rim, 131 and 133, and the inside floor and walls of the adjoining sections will be level. Adjoining sections may be held in place with a combination of adhesives and rivets where there is overlap. The length of a lip should be sufficient to provide some support for an adjoining section and to seat rivits or other fasteners joining such adjoining sections. The discontinuity or crack between adjoining sections should be filled with a sealant so that any hazardous substance in the trough cannot leak through a crack.

Figure 8:
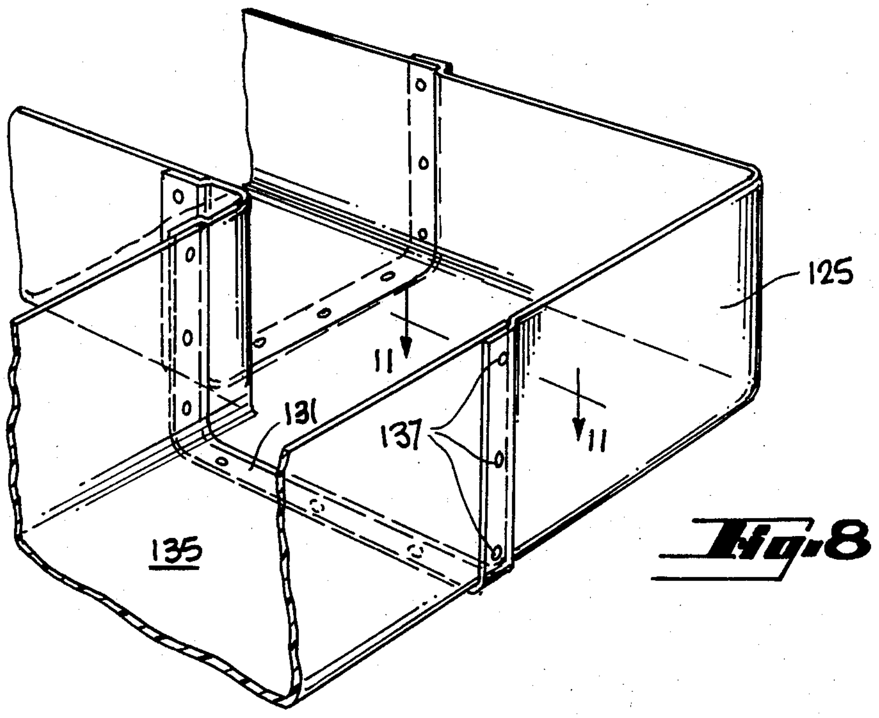
FIG. 8 is a perspective view of the right angle bend connector section of FIG. 7, illustrating the connection of linear sections thereto.

In FIG. 8, the linear trough section 135 is seated upon lip 131 and joined to the right angle connector section 125 by means of a plurality of rivits 137 as well as by an adhesive composition, such as epoxy, providing the adhesive is resistant to contaminants which may be expected to be found in the trough formed by the connected sections.

Figure 9:
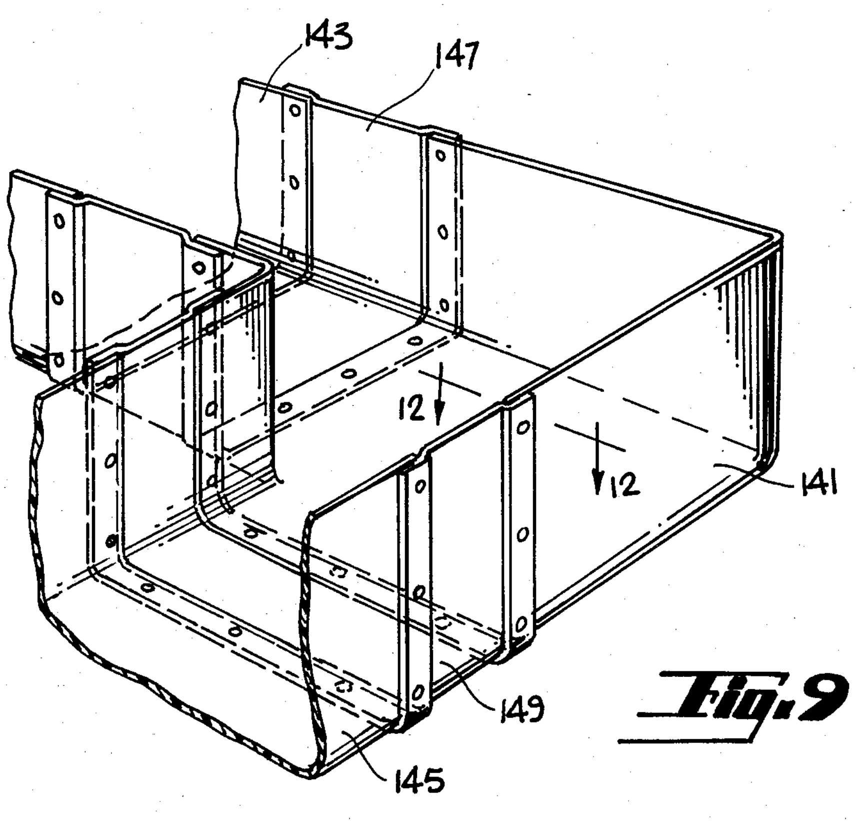
FIG. 9 is a perspective view of an alternate embodiment of the right angle bend connector section of FIG. 7.

With reference to FIG. 9, the right angle connector section 141 may be seen to be joined to the linear sections 143 and 145 by means of auxiliary connector sections, namely nipple sections 147 and 149. In this situation, three connector sections 147, 141 and 149 are joined together between two linear sections 143 and 145. The purpose of this construction is to provide the necessary joints between linear sections 143 and 145 in the situation where the right angle section 141 does not have lips at the outer extremities. The inside walls of all connected sections should be relatively planar, except for slight cracks between adjoining members which are sealed. Adjoining sections are connected by fasteners such as rivits and adhesives.

Figure 10:
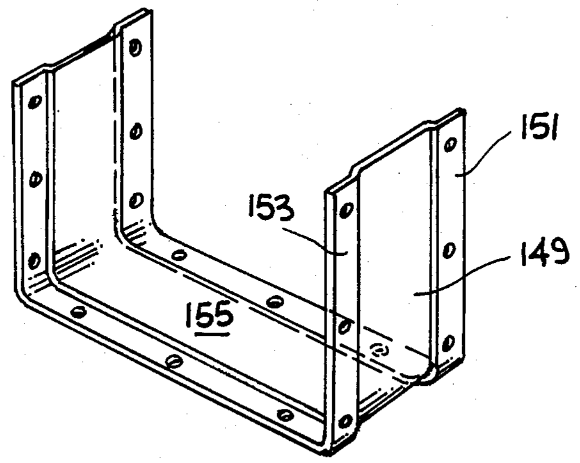
FIG. 10 is a perspective view of a nipple section for use with the right angle bend connector section of FIG. 9.

In FIG. 10, a nipple section 149 may be seen to have the outwardly extending lips 151 and 153 which extend outwardly further than the central section region 155. The lips extend outwardly only as far as needed to support an adjoining section in a manner such that the inside walls will be flush. The length of each lip is sufficient to securely hold fasteners and provide necessary support to an adjoining member.

Figure 11:
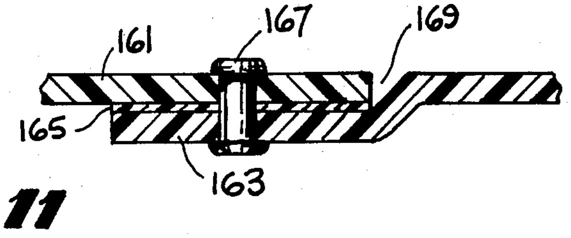
FIGS. 11 and 12 are sectional views of the joints of FIGS. 8 and 9 taken along lines 11—11 and 12—12 respectively.
Figure 12:
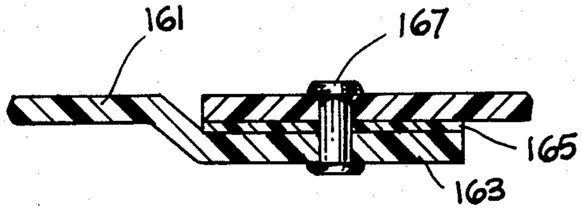

In FIGS. 11 and 12 the manner of overlap between adjoining members at a lip may be seen. The upper section member 161 is placed upon lip 163 and sealed thereto with an adhesive or sealant layer 165. A fastener such as rivit 167 may be used to securely hold the two members in place. The crack 169 between the two members may be filled with caulking material to discourage entry of any contaminants into the sealed region.

A kit in accord with the present invention would include a number of linear sections and a number of connector sections joined together such that pipelines having a source at a storage tank and running to dispenser units would be completely protected by means of the catch basins provided by fluid impervious material joined end-to-end in sealed relation and with overlying cover members. For additional protection, caulking may be applied at opposite edges of connector sections, but, for interlocking edges, this is not essential. The kit includes the needed number of special purpose connector sections to enclose plumbing at dispenser units, turbines or pumps. The installation is effective in preventing contamination of soil from fluid carried in the pipelines.

We claim:

1. A modular pipeline containment kit for environmentally hazardous fluids in pipes comprising, a plurality of trough sections having a bottom wall and upwardly exending opposed sidewalls, said trough sections made of material impervious to said hazardous fluid carried in said pipes, each trough section being linear for carrying linear stretches of pipes, a plurality of connector sections having a bottom wall and upwardly extending sidewalls, each connector section made of said material and having at least one connection end, each connection end having cross-sectional dimensions substantially identical to said trough sections, said connector sections including at least one angled connector section capable of connecting a plurality of non-linearly aligned trough sections, and, joint means for connecting said trough sections to the connector sections.

2. The kit of claim 1 wherein said joint means comprises an outwardly extending lip for receiving an adjacent section.

3. The kit of claim 1 wherein said joint means comprises a nipple connector section having a a bottom wall and opposed sidewalls with cross-sectional dimensions substantially identical to said trough sections, said nipple connector section having outwardly extending lips at opposite ends for receiving an adjacent section.

4. The kit of claim 1 wherein said joint means comprises tongue and groove members.

5. The kit of claim 1 wherein said connector sectins include at least one box section with a plurality of sidewalls, at least one sidewall forming an opening for the passage of pipes, said box sections having a bottom wall, said bottom wall having outer edges attached to said walls and having inner edges defining an opening, said hazardous fluid carried by said pipes originating from a source tank, said inner edges of the bottom wall imperviously secured to said source tank and surrounding said pipes.

6. The kit of claim 1 wherein said connector sections include at least one dispenser profile section, said pipes carrying said hazardous fluid terminating at a dispenser unit, said dispenser profile section having a linear portion with a cross-section substantially identical to said trough sections and having a sloped portion generally matching the cross section of said dispenser unit, said sloped portion having a bottom wall downwardly sloped for attachment to said linear portion and having a plurality of sidewalls.

7. The kit of claim 1 wherein said connector sections further comprise a sump section having a drain hole and an adjacent upright check tube, the check tube connected to the drain hole by a sloping drain pipe, the check tube extending upwardly from the lowest portion of the drain pipe to near surface level.

8. A modular pipeline containment construction for environmentally hazardous fluids in pipes comprising, a plurality of subsurface linear trough secitons, each having U-shaped cross sectional upwardly extending walls and made of a material impervious to said hazardous fluid carried in said pipes to be disposed in said trough sections, a plurality of subsurface connector sections having a bottom wall and upwardly extending sidewalls, each connector section having at least one connector end, each connector end having a similar cross sectional shape as said trough sections said connector sections made of said material and including at least one angled connector section capable of connecting a plurality of non-linearly aligned trough sections, joint means for connecting said trough sections to the connector sections, aggregate material and pipes filling said trough sections and connector sections, a cover member disposed over said trough sections and connector sections, said cover member including a vapor barrier member impervious to water, and a fill material supporting the side walls of the trough sections and connector section and a cap material covering the cover member to surface level.

9. The containment construction of claim 8 wherein said joint means comprises an outwardly extending lip for receiving an adjacent section.

10. The containment construction of claim 8 wherein said connector sections connect with adjacent sections by means of tongue and groove joints.

11. The containment construction of claim 8 wherein said connector sections include at least one box section with a pluality of sidewalls, at least one side wall forming an opening for the passage of pipes, said box sections having a bottom wall, said bottom wall having outer edges attached to said walls and having inner edges defining an opening, said hazardous fluid carried by said pipes originating from a source tank, said inner edges of the bottom wall imperviously secured to said source tank, and surrounding said pipes.

12. The containment construction of claim 11 wherein said connector sections include at least one dispenser profile section, said pipes carrying said hazardous fluid terminating at a dispenser unit, said dispenser profile section having a linear portion with a cross section substantially identical to said trough sections and having a sloped portion generally matching the cross section of said dispenser unit, said sloped portion having a bottom wall downwardly sloped for attachment to said linear portion and having a plurality of sidewalls.

13. The containment construction of claim 12 wherein said connector sections further comprise a sump section having a drain hole and an adjacent upright check tube, the check tube connected to the drain hole by a sloping drain pipe, the check tube extending upwardly from the lowest portion of the drain pipe to near surface level.

14. A service station gasoline dispensing assembly comprising, at least one gasoline storage tank, at least one piping system, each piping system originating at a tank attachment atop a gasoline storage tank, at least one gasoline dispenser unit attached to a piping system opposite said storage tank, at least one box connector section fixed atop each gasoline storage tank, each box section having a plurality of sidewalls and having a bottom wall, said bottom wall having an opening, said opening permitting passage of said tank attachment through said bottom wall, at least one sidewall forming an opening for the passage of said piping system, a plurality of trough sections having a bottom wall and upwardly extending opposed sidewalls, said trough sections made of a gasoline-impervious material, each trough section being linear for carrying a linear stretch of said piping system, a plurality of angled connector sections capable of connecting a plurality of non-linearly aligned trough sections, said angled connector sections made of said material and having a bottom wall and upwardly extending sidewalls, each angled connector section having a plurality of connector ends with cross sectional dimensions substantially identical to said trough sections, at least one sump connector section attached to adjacent sections, each sump connector section having a drain hole and an adjacent upright check tube, said check tube connected to the drain hole by a sloping drain pipe, said check tube extending upwardly from the lowest portion of said drain pipe to near surface level, a dispenser profile connector section disposed below each gasoline dispenser unit, each dispenser profile connector section having a linear portion attached to at least one adjacent section and having a sloped portion, said sloped portion having a downwardly sloped bottom wall, said bottom wall having a lower end fixed to said linear portion, and joint means for connecting adjacent sections.

* * * * *

UNITED STATES PATENT AND TRADEMARK OFFICE
CERTIFICATE OF CORRECTION

PATENT NO. : 4,653,958

DATED : March 31, 1987

INVENTOR(S) : Andrew A. Anderson et al.

It is certified that error appears in the above—identified patent and that said Letters Patent is hereby corrected as shown below:

Column 1, line 43, "applicable to pipeines" should read - -applicable to pipelines- -.

Column 4, line 9, "The special" should read - -These special- -

Column 5, line 30, "drain hole 82" should read - -drain hole 83- -.

Column 5, line 37, "cover 86" should read - -cover 87- -.

Column 5, line 56, "and then joined to joined to linear" should read - -and then joined to linear- -.

Column 5, line 67, "as then turn in the direction" should read - -as they turn in the direction- -.

Column 6, lines 25, 32, 50 and 63, "rivits" should read - -rivets- -.

Column 7, line 45, "said connector sectins" should read - -said connector sections- -.

Column 8, line 5, "linear trough secitons" should read - -linear trough sections- -.

Signed and Sealed this

Twenty-fifth Day of August, 1987

*Attest:*

DONALD J. QUIGG

*Attesting Officer* *Commissioner of Patents and Trademarks*